(12) United States Patent
Fukushima et al.

(10) Patent No.: US 10,562,989 B2
(45) Date of Patent: Feb. 18, 2020

(54) FLUORINE-CONTAINING BORIC ACID PVB COMPOSITE

(71) Applicants: UNIMATEC CO., LTD., Tokyo (JP); HIROSAKI UNIVERSITY, Aomori (JP)

(72) Inventors: Takeshi Fukushima, Ibaraki (JP); Katsuyuki Sato, Ibaraki (JP); Hideo Sawada, Aomori (JP)

(73) Assignees: Unimatec Co., Ltd., Tokyo (JP); Hirosaki University, Aomori (JP)

( * ) Notice: Subject to any disclaimer, the term of this patent is extended or adjusted under 35 U.S.C. 154(b) by 124 days.

(21) Appl. No.: 15/557,349

(22) PCT Filed: Mar. 10, 2016

(86) PCT No.: PCT/JP2016/057565
§ 371 (c)(1),
(2) Date: Sep. 11, 2017

(87) PCT Pub. No.: WO2016/143851
PCT Pub. Date: Sep. 15, 2016

(65) Prior Publication Data
US 2018/0051104 A1    Feb. 22, 2018

(30) Foreign Application Priority Data

Mar. 10, 2015    (JP) .................... 2015-046663

(51) Int. Cl.
*C08F 8/18*    (2006.01)
(52) U.S. Cl.
CPC .................... *C08F 8/18* (2013.01)
(58) Field of Classification Search
CPC . C08F 16/38; C08L 29/14; C08K 3/38; C08K 5/053
See application file for complete search history.

(56) References Cited

U.S. PATENT DOCUMENTS

| | | | | |
|---|---|---|---|---|
| 3,574,770 A * | 4/1971 | Paine | ................... | C07C 43/137 528/70 |
| 4,115,622 A * | 9/1978 | Cartier | ................. | C09D 129/14 428/409 |
| 5,798,170 A | 8/1998 | Zhang et al. | | |
| 7,566,801 B2 | 7/2009 | Murata et al. | | |
| 2003/0228429 A1 | 12/2003 | Ercoli et al. | | |
| 2005/0197408 A1* | 9/2005 | Shirakawa | .......... | C08G 65/007 514/723 |
| 2005/0244590 A1 | 11/2005 | Hiji et al. | | |
| 2009/0036706 A1 | 2/2009 | Murata et al. | | |
| 2009/0171127 A1 | 7/2009 | Murata et al. | | |
| 2013/0273378 A1 | 10/2013 | Iwamoto et al. | | |
| 2015/0219810 A1 | 8/2015 | Taka | | |

FOREIGN PATENT DOCUMENTS

| | | |
|---|---|---|
| JP | 54-62234 | 5/1979 |
| JP | H01252556 | * 10/1989 |
| JP | 06-175386 | 6/1994 |
| JP | 2003-238254 | 8/2003 |
| JP | 2004-9734 A | 1/2004 |
| JP | 2005-316243 A | 11/2005 |
| JP | 2008-038015 A | 2/2008 |
| JP | 4674604 | 2/2011 |
| WO | WO 2007/080949 A1 | 7/2007 |
| WO | WO 2012/091116 A1 | 7/2012 |
| WO | WO 2014/024873 A1 | 2/2014 |
| WO | WO 2015/137343 A1 | 9/2015 |
| WO | WO 2015/137344 A1 | 9/2015 |
| WO | WO 2015/137346 A1 | 9/2015 |

OTHER PUBLICATIONS

Translation of JPH01252556 (1989) (Year: 1989).*
Tonelli, Journal of Fluorine Chemistry 95 (1999) p. 51-70 (Year: 1999).*
International Preliminary Report on Patentability and Written Opinion from corresponding PCT application No. PCT/JP2016/057565 dated Sep. 12, 2017 (7 pgs).
International Search Report and Written Opinion from corresponding PCT application No. PCT/JP2016/057565 dated May 10, 2016 (6 pgs).
Natsuki Jin, Tomoya Saito, Katsuyuki Sato, Hideo Sawada, "*Gan Fusso Alcohol/Hosan/Suisanki Gan'yu Polimer Nano Composites-rui no Chosei to Oyo*", The 95th Annual Meeting of the Chemical Society of Japan in Spring 2015 Nen Koen Yokoshu III, The Chemical Society of Japan, Mar. 11, 2015, p. 679.
Natsuki Jin, Tomoya Saito, Katsuyuki Sato, Hideo Sawada, "*Gan Fusso Alcohol/Hosan/Suisanki Gan'yu Polimer Nano Composites-rui no Chosei to Hyomen Kaishitsuzai eno Oyo*", Heisei 27 Nendo Kagakukeigaku Kyokai Tohoku Taikai Koen Yokoshu, The Chemical Society of Japan Shibucho Hidetoshi Oikawa, Sep. 12, 2015, p. 163.

(Continued)

*Primary Examiner* — Robert C Boyle
(74) *Attorney, Agent, or Firm* — Brinks Gilson & Lione

(57) ABSTRACT

A fluorine-containing boric acid PVB composite comprising a condensate of a fluorine-containing alcohol, boric acid and polyvinyl butyral, wherein the fluorine-containing alcohol is represented by the general formula:

$$Rf(A-OH)_k$$

wherein k is 1 or 2; when k is 1, Rf is a perfluoroalkyl group having 6 or less carbon atoms, a polyfluoroalkyl group in which some of the fluorine atom or atoms of the perfluoroalkyl group are replaced by hydrogen atom or atoms, a polyfluoroalkyl group containing a terminal perfluoroalkyl group having 6 or less carbon atoms and a perfluoroalkylene group having 6 or less carbon atoms, or a linear or branched, perfluoroalkyl group containing a terminal perfluoroalkyl group having 6 or less carbon atoms, a perfluoroalkylene group having 6 or less carbon atoms and ether bonds; when k is 2, Rf is a linear or branched, perfluoroalkylene group or polyfluoroalkylene group, containing a perfluoroalkylene group having 6 or less carbon atoms and ether bonds; and A is an alkylene group having 1 to 6 carbon atoms.

8 Claims, No Drawings

(56) References Cited

OTHER PUBLICATIONS

Natsuki Jin, Tomoya Saito, Katsuyuki Sato, Hideo Sawada, "*Gan Fusso Alcohol/Hosan Nano Composites-rui no Chosei to Oyo*", The 94th Annual Meeting of the Chemical Society of Japan in Spring 2014 Nen Koen Yokoshu III, The Chemical Society of Japan, Mar. 12, 2014, p. 824.

Natsuki Jin, Tomoya Saito, Katsuyuki Sato, Hideo Sawada, "*Gan Fusso Alcohol/Hosan/Guest Bunshi Nano Composites-rui no, Chosei to Seishitsu*", The 94th Annual Meeting of the Chemical Society of Japan in Spring 2014 Nen Koen Yokoshu III, The Chemical Society of Japan, Mar. 12, 2014, p. 1003.

Nukusina, Yasuhiko and Sakurada, Ichiro, "*The Viscosity of the Deformed Rod-like Macromolecule in Solution,*" Bulletin of the Institute for Chemical Research Kyoto University, 1951, vol. 26, pp. 95-96.

Okada, Noboru and Sakurada, Ichiro, "*X-ray Studies on the Reaction between Polyvinyl Alcohol and Borax,*" Bulletin of the Institute for Chemical Research Kyoto University, 1952, vol. 28, p. 78.

Yuta Omi, Takafumi Ogasawara, Masakazu Nishida, Tomoko Tanada, Hideo Sawada, "*Protic-sei Oyobi Hi-Protic-sei Yobaichu ni Okeru Fluoroalkyl-ki Gan'yu Vinyltrimethoxysilane Oligomer/Hosan Nano Composites-rui no Chosei to Korera Nano Composites-fui no Tainetsusei*", The 94th Annual Meeting of the Chimical Society of Japan in Spring 204 Nen Koen Yokoshu III, The Chemical Society of Japan, Mar. 12, 2014, p. 1004.

Concise Statement of Natsuki Jin, Tomoya Saito, Katsuyuki Sato, Hideo Sawada, "*Shuju no Fusso Alcohol/Hosan Nano Composites-rui no Chosei to Oyo*", 2014 Nendo Japan Society of JColour Material Conference Koen Yoshishu, Japan Society ofColour Material, Oct. 23, 2014, p. 116.

Nameki, Hirofumi, "*Preparation of Poly(vinyl butyral)-Silica Hybrid Coating and its Impact Resistance*", Study Report of Aichi Center for Industry and Science Technology, Research and Development Division, AITEC, 2003 (2 pgs).

Concise Statement of Polymer Chemistry, 1954, vol. 11, pp. 23-27.

* cited by examiner

FLUORINE-CONTAINING BORIC ACID PVB COMPOSITE

RELATED APPLICATION

This application is a 35 U.S.C. § 371 national phase filing of International Patent Application No. PCT/JP2016/057565, filed Mar. 10, 20165 through which and to which priority is claimed under 35 U.S.C. § 119 to Japanese Patent Application No. 2015-046663, filed Mar. 10, 2015, the entire disclosure of which is hereby expressly incorporated by reference.

TECHNICAL FIELD

The present invention relates to a fluorine-containing boric acid PVB composite. More particularly, the present invention relates to a fluorine-containing boric acid PVB composite that have improved surface-treatment characteristics.

BACKGROUND ART

It is known that various surface characteristics are developed by coating inorganic material surfaces with various compounds or polymers. In particular, when a fluorine-based compound is used for surface treatment, surface modification can be applied for not only water-repellency, but also oil-repellency, due to characteristics of fluorine atoms. Thus, such fluorine-based compounds are used for coating on various substrates.

In particular, highly water- and oil-repellency coatings can be obtained by applying a surface-treating agent having a $C_8$-perfluoroalkyl group to substrates. However, it is recently reported that compounds containing a perfluoroalkyl group having 7 or more carbon atoms induce intracellular communication inhibition, which is considered to be a carcinogenic factor, in in-vitro tests using cell strains; that this inhibition depends on the length of the fluorinated carbon chain, rather than the functional groups; and that the longer carbon chain the higher inhibitory actively. The production of monomers using fluorinated long-carbon-chain compounds has been restricted.

Moreover, fluorine-containing alcohols containing a perfluoroalkyl group having 6 or less carbon atoms problematically have lack of sufficient adhesion to inorganic substrates such as glass, metal, and stone.

Patent Document 1 discloses a ceramic slurry in which boron oxide $B_2O_3$ is used as a ceramic powder of the ceramic slurry, the hydroxyl group content of a resin binder, which is used polyvinyl butyral [PVB], is 50 mol % or less based on the amount of boron, and the moisture content of an organic solvent is 10 mol % or less based on the amount of boron.

Here, the use of boron oxide as the powder of the ceramic slurry is supposed to suppress the reaction represented by the following formula:

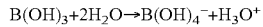

$$B(OH)_3 + 2H_2O \rightarrow B(OH)_4^- + H_3O^+$$

In addition, Patent Document 1 indicates that, due to the amount of hydroxyl groups in the slurry set to 50 mol % or less based on the substance amount of boron, gelation can be prevented, and when the ceramic slurry is applied to a PET film or the like, removal from the film can be suppressed. Ceramic slurries using boric acid are regarded as Comparative Examples.

PRIOR ART DOCUMENTS

Patent Documents

Patent Document 1: JP-A-2003-238254
Patent Document 2: JP-B-4674604
Patent Document 3: WO 2007/080949 A1
Patent Document 4: JP-A-2008-38015
Patent Document 5: U.S. Pat. No. 3,574,770
Patent Document 6: WO 2014/024873 A1
Patent Document 7: WO 2012/091116 A1

Non-Patent Documents

Non-Patent Document 1: Study Report of Aichi Center for Industry and Science Technology (2003)
Non-Patent Document 2: Bulletin of the Institute for Chemical Research Kyoto University (1951), vol. 26, pp. 95-96
Non-Patent Document 3: Bulletin of the Institute for Chemical Research Kyoto University (1952), vol. 28, p. 78
Non-Patent Document 4: Polymer Chemistry (1954), vol. 11, pp. 23-27

OUTLINE OF THE INVENTION

Problem to be Solved by the Invention

An object of the present invention is to provide fluorine-containing boric acid PVB composite that do not produce perfluorooctanoic acid, and the like, even when released into the environment, that is formed using a fluorine-containing alcohol having units easily degradable to short-chain compounds, and that have adhesion to inorganic substrates, and the like, and having water repellency and oil repellency.

Means for Solving the Problem

The present invention provides a fluorine-containing boric acid PVB composite comprising a condensate of a fluorine-containing alcohol, boric acid and polyvinyl butyral, wherein the fluorine-containing alcohol is represented by the general formula:

$$Rf(A-OH)_k \qquad [X]$$

wherein k is 1 or 2; when k is 1, Rf is a perfluoroalkyl group having 6 or less carbon atoms, a polyfluoroalkyl group in which some of the fluorine atom or atoms of the perfluoroalkyl group are replaced by hydrogen atom or atoms, a polyfluoroalkyl group containing a terminal perfluoroalkyl group having 6 or less carbon atoms and a perfluoroalkylene group having 6 or less carbon atoms, or a linear or branched, perfluoroalkyl group containing a terminal perfluoroalkyl group having 6 or less carbon atoms, a perfluoroalkylene group having 6 or less carbon atoms and ether bonds; when k is 2, Rf is a linear or branched, perfluoroalkylene group or polyfluoroalkylene group, containing a perfluoroalkylene group having 6 or less carbon atoms and ether bonds; and A is an alkylene group having 1 to 6 carbon atoms.

Effect of the Invention

In the fluorine-containing alcohols used in the present invention, the carbon number of the terminal perfluoroalkyl group, the terminal polyfluoroalkyl group, the perfluoroalkyl group or the perfluoroalkylene chain in a polyfluoroalkyl group is 6 or less, and units easily degradable to short-chain compounds are contained. Therefore, the fluorine-containing alcohols do not lead to environmental pollution.

Moreover, a mixture of the fluorine-containing alcohol and polyvinyl butyral has water- and oil-repellency. In a fluorine-containing boric acid PVB composite obtained by reacting these components with boric acid, the fluorine-containing alcohol is absorbed by the boric acid, which serves as the core of the composite. A thin film in which this composite is formed on a substrate surface forms a composite with PVB; therefore, this thin film exhibits superior oil repellency while showing equivalent adhesion to inorganic substrates, such as glass, metal and stone, compared with thin films formed from PVB alone or PVB-boric acid compounds. Furthermore, the type of fluorine-containing alcohol to be used can be changed in various ways to thereby allow the formation of thin films having different surface properties.

EMBODIMENTS FOR CARRYING OUT THE INVENTION

An example of the fluorine-containing alcohol represented by the general formula [X] is a fluorine-containing alcohol represented by the general formula:

$$R_F\text{-A-OH} \qquad [I]$$

wherein $R_F$ is a perfluoroalkyl group having 6 or less carbon atoms, a polyfluoroalkyl group in which some of the fluorine atom or atoms of the perfluoroalkyl group are replaced by hydrogen atom or atoms, or a polyfluoroalkyl group containing a terminal perfluoroalkyl group having 6 or less carbon atoms and a perfluoroalkylene group having 6 or less carbon atoms; and A is an alkylene group having 1 to 6 carbon atoms. An organic solvent solution comprising a mixture of the fluorine-containing alcohol [I] and polyvinyl butyral is used as a surface-treating agent for various substrates.

Another example of the fluorine-containing alcohol represented by the general formula [X] is a fluorine-containing alcohol represented by the general formula:

$$R_F'\text{-A-OH} \qquad [Ia]$$

or the general formula:

$$\text{HO-A-}R_F''\text{-A-OH} \qquad [Ib]$$

wherein $R_F'$ is a linear or branched perfluoroalkyl group containing a terminal perfluoroalkyl group having 6 or less carbon atoms, a perfluoroalkylene group having 6 or less carbon atoms, and ether bonds; $R_F''$ is a linear or branched, perfluoroalkylene group or polyfluoroalkylene group, containing a perfluoroalkylene group having 6 or less carbon atoms and ether bonds; and A is an alkylene group having 1 to 6 carbon atoms. An organic solvent solution comprising a mixture of the fluorine-containing alcohol [Ia] or [Ib] and polyvinyl butyral is used as a surface-treating agent for various substrates.

The fluorine-containing alcohol [I] is, for example, a polyfluoroalkyl alcohol represented by the general formula:

$$C_nF_{2n+i}(CH_2)_j\text{OH} \qquad [II]$$

n: 1 to 6, preferably 4 to 6
j: 1 to 6, preferably 1 to 3, particularly preferably 2

The alkylene group A is, for example, a CH$_2$ group, a CH$_2$CH$_2$ group, or the like. Examples of the perfluoroalkylalkyl alcohols having such an alkylene group include 2,2,2-trifluoroethanol (CF$_3$CH$_2$OH), 3,3,3-trifluoropropanol (CF$_3$CH$_2$CH$_2$OH), 2,2,3,3,3-pentafluoropropanol (CF$_3$CF$_2$CH$_2$OH), 3,3,4,4,4-pentafluorobutanol (CF$_3$CF$_2$CH$_2$CH$_2$OH), 2,2,3,3,4,4,5,5,5-nonafluoropentanol (CF$_3$CF$_2$CF$_2$CF$_2$CH$_2$OH), 3,3,4,4,5,5,6,6,6-nonafluorohexanol (CF$_3$CF$_2$CF$_2$CF$_2$CH$_2$CH$_2$OH), 3,3,4,4,5,5,6,6,7,7,8,8,8-tridecafluorooctanol (CF$_3$CF$_2$CF$_2$CF$_2$CF$_2$CF$_2$CH$_2$CH$_2$OH), and the like.

Moreover, the polyfluoroalkyl group refers to a group in which a terminal CF$_3$ group in a terminal perfluoroalkyl group is replaced by, for example, a CF$_2$H group or a group in which an intermediate CF$_2$ group is replaced by a CFH group or a CH$_2$ group. Examples of the fluorine-containing alcohol [I] having such a substituent include 2,2,3,3-tetrafluoropropanol (HCF$_2$CF$_2$CH$_2$OH), 2,2,3,4,4,4-hexafluorobutanol (CF$_3$CHFCF$_2$CH$_2$OH), 2,2,3,3,4,4,5,5-octafluoropentanol (HCF$_2$CF$_2$CF$_2$CF$_2$CH$_2$OH), and the like.

The polyfluoroalkyl alcohol represented by the general formula [II] is described, for example, in Patent Document 2, and is synthesized through the following series of steps.

First, a polyfluoroalkyl iodide represented by the general formula:

$$C_nF_{2n+1}(CF_2CF_2)_b(CH_2CH_2)_cI$$

is reacted with N-methylformamide HCONH(CH$_3$) to form a mixture of polyfluoroalkyl alcohol and its formate. Then, the mixture is subjected to a hydrolysis reaction in the presence of an acid catalyst to form a polyfluoroalkyl alcohol of the general formula:

$$C_nF_{2+1}(CF_2CF_2)_b(CH_2CH_2)_c\text{OH}$$

However, the value of n+2b is 6 or less.
Examples of the polyfluoroalkyl iodide include the following:

CF$_3$(CH$_2$CH$_2$)I
CF$_3$(CH$_2$CH$_2$)$_2$I
C$_2$F$_5$(CH$_2$CH$_2$)I
C$_2$F$_5$(CH$_2$CH$_2$)$_2$I
C$_3$F$_7$(CH$_2$CH$_2$)I
C$_3$F$_7$(CH$_2$CH$_2$)$_2$I
C$_4$F$_9$(CH$_2$CH$_2$)I
C$_4$F$_9$(CH$_2$CH$_2$)$_2$I
C$_2$F$_5$(CF$_2$CF$_2$)(CH$_2$CH$_2$)I
C$_2$F$_5$(CF$_2$CF$_2$)(CH$_2$CH$_2$)$_2$I
C$_2$F$_5$(CF$_2$CF$_2$)$_2$(CH$_2$CH$_2$)I
C$_2$F$_5$(CF$_2$CF$_2$)$_2$(CH$_2$CH$_2$)$_2$I
C$_4$F$_9$(CF$_2$CF$_2$)(CH$_2$CH$_2$)I
C$_4$F$_9$(CF$_2$CF$_2$)(CH$_2$CH$_2$)$_2$I

The fluorine-containing alcohol [I] may also be a fluorine-containing alcohol wherein the $R_F$ group is a polyfluoroalkyl group which contains a terminal perfluoroalkyl group having 6 or less carbon atoms and a perfluoroalkylene group having 6 or less carbon atoms, specifically, a polyfluoroalkyl group having 3 to 20 carbon atoms, preferably 6 to 10 carbon atoms, and A is an alkylene group having 2 to 6 carbon atoms, preferably 2 carbon atoms. Examples thereof, for example, include a polyfluoroalkyl alcohol represented by the general formula:

$$C_nF_{2n+1}(CH_2CF_2)_a(CF_2CF_2)_b(CH_2CH_2)_c\text{OH} \qquad [III]$$

n: 1 to 6, preferably 2 to 4
a: 1 to 4, preferably 1
b: 0 to 2, preferably 1 or 2
c: 1 to 3, preferably 1

The polyfluoroalkyl alcohol represented by the general formula [III] is disclosed in Patent Document 2, and synthesized through the following series of steps.

First, a polyfluoroalkyl iodide represented by the general formula:

$$C_nF_{2n+1}(CH_2CF_2)_a(CF_2CF_2)_b(CH_2CH_2)_cI$$

is reacted with N-methylformamide $HCONH(CH_3)$ to form a mixture of polyfluoroalkyl alcohol and its formate. The mixture is then subjected to a hydrolysis reaction in the presence of an acid catalyst to form a polyfluoroalkyl alcohol of the general formula:

$$C_nF_{2n+1}(CH_2CF_2)_a(CF_2CF_2)_b(CH_2CH_2)_cOH$$

Examples of the polyfluoroalkyl iodide include the following:

$CF_3(CH_2CF_2)(CH_2CH_2)I$
$C_2F_5(CH_2CF_2)(CH_2CH_2)I$
$C_2F_5(CH_2CF_2)(CH_2CH_2)_2I$
$C_3F_7(CH_2CF_2)(CH_2CH_2)I$
$C_3F_7(CH_2CF_2)(CH_2CH_2)_2I$
$C_4F_9(CH_2CF_2)(CH_2CH_2)I$
$C_4F_9(CH_2CF_2)(CH_2CH_2)_2I$
$C_2F_5(CH_2CF_2)(CF_2CF_2)(CH_2CH_2)I$
$C_2F_5(CH_2CF_2)(CF_2CF_2)(CH_2CH_2)_2I$
$C_2F_5(CH_2CF_2)_2(CF_2CF_2)(CH_2CH_2)I$
$C_2F_5(CH_2CF_2)_2(CF_2CF_2)(CH_2CH_2)_2I$
$C_4F_9(CH_2CF_2)(CF_2CF_2)(CH_2CH_2)I$
$C_4F_9(CH_2CF_2)_2(CF_2CF_2)(CH_2CH_2)I$
$C_4F_9(CH_2CF_2)(CF_2CF_2)(CH_2CH_2)_2I$
$C_4F_9(CH_2CF_2)_2(CF_2CF_2)(CH_2CH_2)_2I$

The fluorine-containing alcohol [Ia] may be a fluorine-containing alcohol wherein the $R_F'$ group is a linear or branched, perfluoroalkyl group containing a terminal perfluoroalkyl group having 6 or less carbon atoms, a perfluoroalkylene group having 6 or less carbon atoms and ether bonds, specifically, an ether bonds-containing perfluoroalkyl group having 3 to 305 carbon atoms, preferably 8 to 35 carbon atoms, and A is an alkylene group having 1 to 3 carbon atoms, preferably 1 carbon atom. Examples thereof, for example, include a hexafluoropropene oxide oligomer alcohol represented by the general formula:

$$C_mF_{2m+1}O[CF(CF_3)CF_2O]_dCF(CF_3)(CH_2)_eOH \quad [IIa]$$

m: 1 to 3, preferably 3
d: 0 to 100, preferably 1 to 10
e: 1 to 3, preferably 1 or polyfluoropolyether alcohol represented by the general formula:

$$C_mF_{2m+1}(OCF_2CF_2CF_2)_s(OCF_2CF_2)_t(OCF_2)_u(CH_2)_vOH \quad [IIa']$$

m: 1 to 3, preferably 3
s, t, u: integer of 0 to 200, preferably 0 to 80, respectively
v: 1 or 2, preferably 1

Moreover, the fluorine-containing alcohol [Ib] may be a fluorine-containing alcohol wherein the $R_F''$ group contains a perfluoroalkylene group having 6 or less carbon atoms and ether bonds, specifically, a perfluoroalkylene group or polyfluoroalkylene group having 5 to 160 carbon atoms, and A is an alkylene group having 1 to 3 carbon atoms, preferably 1 carbon atom, for example, a per or polyfluoroalkylene ether diol represented by the general formula:

$$HO(CH_2)_fCF(CF_3)[OCF_2CF(CF_3)]_gO(CF_2)_hO[CF(CF_3)CF_2O]_iCF(CF_3)(CH_2)_fOH \quad [IIb]$$

f: 1 to 3, preferably 1
g+i: 0 to 50, preferably 2 to 50
h: 1 to 6, preferably 2 or represented by the general formula:

$$HO(CH_2CH_2O)_pCH_2CF_2(OCF_2CF_2)_q(OCF_2)_rOCF_2CH_2(OCH_2CH_2)_pOH \quad [IIb']$$

p: 0 to 6, preferably 1 to 4
q+r: 0 to 50, preferably 10 to 40

Among the hexafluoropropene oxide oligomer alcohols represented by the general formula [IIa], a compound wherein m is 1 and e is 1 is described in Patent Document 3, and they are synthesized through the following step.

A fluorine-containing ether carboxylic acid alkyl ester represented by the general formula: $CF_3O[CF(CF_3)CF_2O]_nCF(CF_3)COOR$ (R: an alkyl group, n: an integer of 0 to 12) is subjected to a reduction reaction using a reducing agent such as sodium boron hydride.

As the polyfluoropolyether alcohol represented by the general formula [IIa'], a commercial product, such as DEMNUM SA (produced by Daikin Industries, Ltd.) or the like, can be used.

Moreover, among the perfluoroalkylene ether diols represented by the general formula [IIb], a compound wherein f=1 is disclosed in Patent Documents 4 and 5, and they are synthesized via the following series of steps:

$$FOCR_fCOF \rightarrow H_3COOCR_fCOOCH_3 \rightarrow HOCH_2R_fCH_2OH$$

Rf: $-CF(CF_3)[OCF_2C(CF_3)]_aO(CF_2)_cO[CF(CF_3)CF_2O]_bCF(CF_3)-$

As the polyfluoroalkylene ether diol represented by the general formula [IIb'], a commercial product, such as Fomblin Z DOL TX (produced by Solvay Solexis) or the like, can be used.

Usable polyvinyl butyral is obtained by saponifying polyvinyl acetate [PVAc], and acetalizing the saponified polyvinyl alcohol [PVA] with butyraldehyde. The degree of saponification of PVAc is generally about 70 to 99.9 mol %, and unsaponified portions remain as acetyl groups. PVB obtained by saponification has an average molecular weight of about $1 \times 10^4$ to $2 \times 10^5$, and a degree of butyralization (according to JIS K6728) of about 50 to 80 mol %

Practically, commercial products, such as S-LEC B series (produced by Sekisui Chemical Co., Ltd.), Denka Butyral (produced by Denka Company Limited), and the like, can be used.

Polyvinyl butyral has the characteristics of being soluble in various solvents, and is mainly used as a glass interlayer or a coating compounding agent (Patent Documents 6 and 7). Patent Document 7 indicates that a compound having a boron atom is uniformly dispersed in polyvinyl butyral resin. This is because, according to Patent Document 7, extrusion molding of each layer in an interlayer for laminated glass is facilitated. Moreover, it is known that a thin film having adhesion, surface hardness and impact resistance can be formed by forming a composite of polyvinyl butyral and inorganic particles, such as silica (Non-Patent Document 1).

For PVA, which is a precursor of PVB, there is fundamental research on the viscosity increase of composite materials in which a boron compound or the like is added (Non-Patent Documents 2 to 4).

The amounts of these components used are as follows: based on 100 parts by weight of the fluorine-containing alcohol, boric acid is used at a ratio of about 0.1 to 100 parts by weight, preferably about 10 to 60 parts by weight, generally in an equimolar amount, and polyvinyl butyral is used at a ratio of about 5 to 600 parts by weight, preferably about 10 to 200 parts by weight. If the ratio of boric acid used is greater than this range, dispersibility in solvents decreases. Moreover, if the ratio of polyvinyl butyral used is greater than this range, water- and oil-repellency decreases.

When boric acid is not used, an organic solvent solution of the fluorine-containing alcohol and polyvinyl butyral, such as a methanol or tetrahydrofuran solution having a concentration of about 1.0 to 3.0 g/L, exhibits excellent oil repellency. The reaction between the fluorine-containing alcohol (and boric acid) and polyvinyl butyral is generally performed by mixing them at room temperature using a solvent (e.g., tetrahydrofuran) that can dissolve these components.

The amount of fluorine-containing alcohol in the obtained fluorine-containing boric acid PVB composite is about 25 to 98 mol %, preferably about 40 to 70 mol %. The composite size (measured by a dynamic light scattering method) is about 10 to 600 nm, preferably about 15 to 350 nm.

The use of a mixture of the fluorine-containing alcohol and polyvinyl butyral allows coating having adhesion to inorganic substrates, such as glass, and water- and oil-repellency. Moreover, in the fluorine-containing boric acid PVB composite obtained by reacting these components with boric acid, the fluorine-containing alcohol is considered to be linked to the hydroxyl group of the boric acid particles; therefore, the chemical and thermal stability of boric acid, and the excellent water- and oil-repellency, antifouling properties, etc., of fluorine are effectively exhibited. Actually, a product obtained by treating a glass surface with the fluorine-containing boric acid PVB composite exhibits excellent water- and oil-repellency.

The fluorine-containing boric acid PVB composite can also be formed as a condensation reaction product of the fluorine-containing alcohol, polyvinyl butyral and boric acid particles; however, other components are allowed to be mixed as long as the objects of the present invention are not impaired. Examples of such other components include plasticizers, such as organic ester plasticizers, which are organic mono- or polycarboxylic acid esters, organic phosphate plasticizers, and organic phosphite plasticizers; preferably liquid plasticizers.

EXAMPLES

The following describes the present invention with reference to Examples.

Example 1

In a 30-ml reaction vessel, 100 mg (0.27 mol) of $CF_3(CF_2)_5(CH_2)_2OH$ [FA-6], 17 mg (0.27 mol) of boric acid, and 5 ml of tetrahydrofuran were charged, and the mixture was stirred at room temperature condition for 5 hours. Thereafter, a polymer solution comprising 500 mg ($9.62 \times 10^{-3}$ mmol; calculated from average molecular weight) of polyvinyl butyral [PVB] (S-LEC B BM-2, produced by Sekisui Chemical Co., Ltd.; average degree of polymerization of PVB: $5.2 \times 10^4$, degree of butyralization: 68 mol %, degree of acetylation: 1 mol %, hydroxyl group content: 31 mol %) dissolved in 15 ml of tetrahydrofuran was added dropwise, and the homogeneity of the reaction solution was visually confirmed. Then, the reaction solution was stirred at room temperature for a whole day and night. After completion of the reaction, the solvent was distilled off at 80° C., and the collected product was dried in a dryer at 70° C., and then in a vacuum dryer at 50° C. Thus, 555.3 mg (yield: 90%) of fluorine-containing boric acid PVB composite was obtained.

The obtained composite was measured for the following items. Particle size and its variation: Table 1

The particle size and its variation were measured using a methanol dispersion having a solid matters content of 1 g/L at 25° C. by a dynamic light scattering (DLS) method Contact angle of droplets (unit: °): Table 2

Glass slides (micro cover glass, produced by MATSUNAMI Co., Ltd) were dipped in methanol dispersions (particle concentration: 5 g/L), and then dried under room temperature condition. Four µl of droplets of n-dodecane or water were gently brought into contact with the obtained thin layer surfaces, and the contact angle of the droplets adhering to the thin layer surfaces was measured by the θ/2 method using a contact angle meter (Drop Master 300, produced by Kyowa Interface Science Co., Ltd.). The contact angle with water was measured with time.

Adhesion to glass substrate: Adhesion was measured by a tape peeling test

The results indicated that all of the Examples and Comparative Examples did not show a particular decrease in water- and oil-repellency in the contact angle measurement before and after the tape peeling test, and had excellent adhesion.

Examples 2 to 5

In Example 1, the amount of fluorine-containing alcohol (FA-6) and the amount of boric acid were changed in various ways.

TABLE 1

| Example | FA-6 mg | FA-6 mM | Boric acid mg | Boric acid mM | Product amount (mg) | Yield (%) | Particle size (nm) |
|---|---|---|---|---|---|---|---|
| 1 | 100 | 0.27 | 17 | 0.27 | 555.3 | 90 | 430.3 ± 44.5 |
| 2 | 200 | 0.55 | 43 | 0.70 | 594.4 | 80 | 24.3 ± 2.4 |
| 3 | 300 | 0.82 | 51 | 0.82 | 731.9 | 86 | 319.6 ± 82.8 |
| 4 | 400 | 1.10 | 68 | 1.10 | 803.4 | 83 | 244.1 ± 61.9 |
| 5 | 500 | 1.37 | 85 | 1.37 | 889.7 | 82 | 482.3 ± 125.4 |

TABLE 2

(Glass Substrates)

| Example | n-dodecane | Water (elapsed time: min.) 0 | 5 | 10 | 15 | 20 | 25 | 30 |
|---|---|---|---|---|---|---|---|---|
| 1 | 23 | 62 | 63 | 60 | 56 | 51 | 48 | 42 |
| 2 | 22 | 65 | 64 | 60 | 57 | 52 | 48 | 44 |
| 3 | 29 | 66 | 66 | 62 | 57 | 54 | 50 | 45 |
| 4 | 25 | 65 | 62 | 50 | 44 | 39 | 35 | 28 |
| 5 | 35 | 70 | 50 | 45 | 41 | 34 | 34 | 28 |

Examples 6 to 9

In Example 1, 10 mg (0.03 mmol) of fluorine-containing alcohol (FA-6), 10 ml in total of tetrahydrofuran, and various amounts of polyvinyl butyral (PVB) were used, and boric acid was not used. The obtained mixture solutions were used as coating solutions as they were.

Example 6: PVB 10 mg ($1.92 \times 10^{-4}$ mmol)
Example 7: PVB 5 mg ($9.62 \times 10^{-5}$ mmol)
Example 8: PVB 2 mg ($3.85 \times 10^{-5}$ mmol)
Example 9: PVB 1 mg ($1.92 \times 10^{-5}$ mmol)

Table 3 shows the contact angle of the droplet with a glass substrate, and Table 4 shows the contact angle of the droplet with a PET film substrate.

TABLE 3

(Glass Substrates)

| Example | n-dodecane | Water (elapsed time: min.) | | | | | | |
|---|---|---|---|---|---|---|---|---|
| | | 0 | 5 | 10 | 15 | 20 | 25 | 30 |
| 6 | 30 | 59 | 52 | 49 | 42 | 39 | 32 | 30 |
| 7 | 28 | 52 | 46 | 49 | 36 | 32 | 27 | 22 |
| 8 | 30 | 51 | 44 | 40 | 36 | 31 | 25 | 20 |
| 9 | 46 | 79 | 76 | 76 | 64 | 55 | 47 | 44 |

TABLE 4

(PET film)

| Example | n-dodecane | Water (elapsed time: min.) | | | | | | |
|---|---|---|---|---|---|---|---|---|
| | | 0 | 5 | 10 | 15 | 20 | 25 | 30 |
| 6 | 32 | 81 | 78 | 78 | 74 | 64 | 57 | 50 |
| 7 | 36 | 77 | 72 | 72 | 65 | 54 | 51 | 44 |
| 8 | 31 | 81 | 68 | 68 | 65 | 57 | 52 | 46 |
| 9 | 37 | 90 | 81 | 81 | 74 | 56 | 47 | 46 |

Examples 10 to 14

In Example 1, 5 mg (0.0024 mmol) of Fomblin Z DOL TX (produced by Solvay Solexis) of the following formula:

$$HO(CH_2CH_2O)_pCH_2CF_2(OCF_2CF_2)_q(OCF_2)_rOCF_2CH_2(OCH_2CH_2)_pOH$$

p: 3
q+r: 20 was used as the fluorine-containing alcohol, and 0.5 mg ($9.62 \times 10^{-6}$ mmol) of polyvinyl butyral, 5 ml in total of tetrahydrofuran, and various amounts of boric acid were used. The obtained reaction solutions were used as coating solutions as they were.

Example 10: Boric acid 5.0 mg (0.081 mmol)
Example 11: Boric acid 2.5 mg (0.040 mmol)
Example 12: Boric acid 1.0 mg (0.016 mmol)
Example 13: Boric acid 0.5 mg (0.008 mmol)
Example 14: Boric acid—

Table 5 shows the contact angle of the droplet with a glass substrate.

TABLE 5

(Glass Substrates)

| Example | n-dodecane | Water (elapsed time: min.) | | | | | | |
|---|---|---|---|---|---|---|---|---|
| | | 0 | 5 | 10 | 15 | 20 | 25 | 30 |
| 10 | 57 | 69 | 41 | 39 | 34 | 31 | 28 | 15 |
| 11 | 60 | 80 | 51 | 48 | 42 | 38 | 34 | 22 |
| 12 | 57 | 63 | 42 | 38 | 33 | 30 | 21 | 18 |
| 13 | 56 | 69 | 45 | 43 | 39 | 34 | 32 | 29 |
| 14 | 57 | 76 | 57 | 53 | 49 | 45 | 41 | 36 |

When Examples 10 to 14 described above are each evaluated based on Comparative Example 4 (PVB/boric acid) described below, it is revealed that Examples 10 to 14 are superior in terms of the contact angle with n-dodecane. That is, they are considered to be superior in oil repellency.

Comparative Examples 1 to 5

In the droplet contact angle measurement in Example 1, glass substrates (Table 6) or PET film substrates (Table 7), both of which were coated with a methanol dispersion (5 g/L) of the following sample in place of the fluorine-containing boric acid PVB composite methanol dispersion, were used.

Comparative Example 1: glass substrate alone (no coating)
Comparative Example 2: PET film substrate alone (no coating)
Comparative Example 3: PBV
Comparative Example 4: PBV/boric acid (500 mg, $9.62 \times 10^{-3}$ mmol/85 mg, 1.37 mmol)
Comparative Example 5: Boric acid

TABLE 6

(Glass Substrates)

| Comparative Example | n-dodecane | Water (elapsed time: min.) | | | | | | |
|---|---|---|---|---|---|---|---|---|
| | | 0 | 5 | 10 | 15 | 20 | 25 | 30 |
| 1 | 0 | 50 | 41 | 36 | 34 | 31 | 26 | 29 |
| 2 | — | — | — | — | — | — | — | — |
| 3 | 13 | 85 | 79 | 73 | 70 | 67 | 62 | 52 |
| 4 | 41 | 93 | 79 | 74 | 71 | 65 | 61 | 50 |
| 5 | 22 | 66 | 47 | 43 | 39 | 37 | 32 | 27 |

TABLE 7

(PET film)

| Comparative Example | n-dodecane | Water (elapsed time: min.) | | | | | | |
|---|---|---|---|---|---|---|---|---|
| | | 0 | 5 | 10 | 15 | 20 | 25 | 30 |
| 1 | — | — | — | — | — | — | — | — |
| 2 | 0 | 76 | 68 | 66 | 61 | 60 | 60 | 58 |
| 3 | 13 | 85 | 79 | 73 | 70 | 67 | 62 | 52 |
| 4 | 41 | 93 | 79 | 74 | 71 | 65 | 61 | 50 |
| 5 | 22 | 66 | 47 | 43 | 39 | 37 | 32 | 27 |

The invention claimed is:

1. A fluorine-containing boric acid PVB composite comprising a condensate of a fluorine-containing alcohol, boric acid and polyvinyl butyral, wherein the fluorine-containing alcohol is represented by the general formula:

$$C_nF_{2n+1}(CH_2CF_2)_a(CF_2CF_2)_b(CH_2CH_2)_cOH \qquad [III]$$

wherein n is an integer of 1 to 6, a is an integer of 1 to 4, b is an integer of 0 to 2, and c is an integer of 1 to 3,
wherein, based on 100 parts by weight of fluorine-containing alcohol, the boric acid is used at a ratio of 0.1 to 100 parts by weight, and the polyvinyl butyral is used at a ratio of 5 to 600 parts by weight.

2. A fluorine-containing boric acid PVB composite comprising a condensate of a fluorine-containing alcohol, boric acid and polyvinyl butyral, wherein the fluorine-containing alcohol is a hexafluoropropene oxide oligomer alcohol represented by the general formula:

$$C_mF_{2m+1}O[CF(CF_3)CF_2O]_dCF(CF_3)(CH_2)_eOH \qquad [IIa]$$

wherein m is an integer of 1 to 3, d is an integer of 0 to 100 and e is an integer of 1 to 3,
wherein, based on 100 parts by weight of fluorine-containing alcohol, the boric acid is used at a ratio of 0.1 to 100 parts by weight, and the polyvinyl butyral is used at a ratio of 5 to 600 parts by weight.

3. A fluorine-containing boric acid PVB composite comprising a condensate of a fluorine-containing alcohol, boric acid and polyvinyl butyral, wherein the fluorine-containing alcohol is a perfluoroalkylene ether diol represented by the general formula:

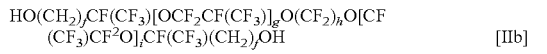 [IIb]

wherein f is an integer of 1 to 3, g+i is an integer of 0 to 50, and h is an integer of 1 to 6, wherein, based on 100 parts by weight of fluorine-containing alcohol, the boric acid is used at a ratio of 0.1 to 100 parts by weight, and the polyvinyl butyral is used at a ratio of 5 to 600 parts by weight.

4. A fluorine-containing boric acid PVB composite comprising a condensate of a fluorine-containing alcohol, boric acid and polyvinyl butyral, wherein the fluorine-containing alcohol represented by the general formula [Ib] is a polyfluoroalkylene ether diol represented by the general formula:

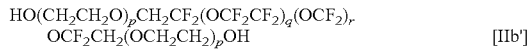 [IIb']

wherein p is an integer of 0 to 6, q+r is an integer of 0 to 50, wherein, based on 100 parts by weight of fluorine-containing alcohol, the boric acid is used at a ratio of 0.1 to 100 parts by weight, and the polyvinyl butyral is used at a ratio of 5 to 600 parts by weight.

5. A surface-treating agent comprising the fluorine-containing boric acid PVB composite according to claim 1, as an active ingredient.

6. A surface-treating agent comprising the fluorine-containing boric acid PVB composite according to claim 2, as an active ingredient.

7. A surface-treating agent comprising the fluorine-containing boric acid PVB composite according to claim 3, as an active ingredient.

8. A surface-treating agent comprising the fluorine-containing boric acid PVB composite according to claim 4, as an active ingredient.

* * * * *